Jan. 17, 1950

H. S. CAMPBELL 2,494,985

AIRCRAFT ROTOR DAMPING DEVICE

Filed Oct. 26, 1946

INVENTOR
Harris S. Campbell
BY
ATTORNEYS

Patented Jan. 17, 1950

2,494,985

UNITED STATES PATENT OFFICE 2,494,985

AIRCRAFT ROTOR DAMPING DEVICE

Harris S. Campbell, Bryn Athyn, Pa., assignor to The Firestone Tire & Rubber Company, Akron, Ohio, a corporation of Ohio Application October 26, 1946, Serial No. 706,013

6 Claims. (Cl. 170—160.55)

This invention relates to rotors for rotary wing aircraft and is more particularly directed toward a damper mechanism for use in the control of rotor blade movements.

In rotary wing aircraft it is customary in many instances to provide sustaining rotors having rotor blades which are pivotally connected to the rotor hub structure for motion in the flapping sense and the drag sense. The pivot for motions in the drag sense may take the form of a hinge having its axis approximately perpendicular to the blade axis in a generally vertical plane. Motion upon this pivot allows a blade to depart from its true radial position in a leading or lagging direction. The main purpose of this hinge is to allow each blade to move freely in the plane of rotation under the influence of centrifugal, dynamic and aerodynamic forces to assume at all times a position of equilibrium. The aerodynamic forces on the blades change continuously during each cycle of rotation when there is cross flow over the rotor such as occurs during forward flight. The position of equilibrium will also change during each revolution with the result that each blade has a swinging motion of small amplitude on the vertical pivot. This swinging motion will make a complete cycle once per revolution.

Since at any instant the position of each blade with respect to its radial position is determined by its relative position in the rotational cycle, the blades in the rotor will be constantly changing their spacing with respect to each other during flight at forward speeds. When there is no cross flow across the rotor such as during hovering flight the aerodynamic forces remain constant on each blade so that the spacing between blades remains equal during rotation and no swinging relative to the blades' radial position occurs.

The existence of drag pivots for attachment of the blades to a rotor hub gives freedom of movement of the blade masses in the plane of rotation. This freedom results in a dynamic structure which at certain critical speeds of rotation while the craft is resting on the ground results in a condition of instability. Such instability is produced by a coupling between motion of the supporting structure for the rotor including the landing gear and tires and the pendular action of the blades on the drag pivots. Due to the elastic flexibility of the supporting structure and the pendular frequency of the blades the coupling action may produce at the critical speeds violent and uncontrollable rotor blade oscillations which may reach destructive proportions if uncontrolled.

The present invention is concerned with a damping device suitable for use with an aircraft rotor to control instability or resonant movements of blades.

The primary object of the present invention is to provide an extremely simple damper construction for this purpose.

Another object of the invention is the provision of a damper structure which may be readily adjusted to the proper setting to give the damping action required and which will maintain this adjustment for long periods of time in spite of wear incidental to operation.

A further object of the invention is to provide a damper construction which is easy to service, or to remove and replace in the event of damage.

How the foregoing and other objects and advantages of this invention are attained will be evident from the following description of the drawings in which—

Figure 1:
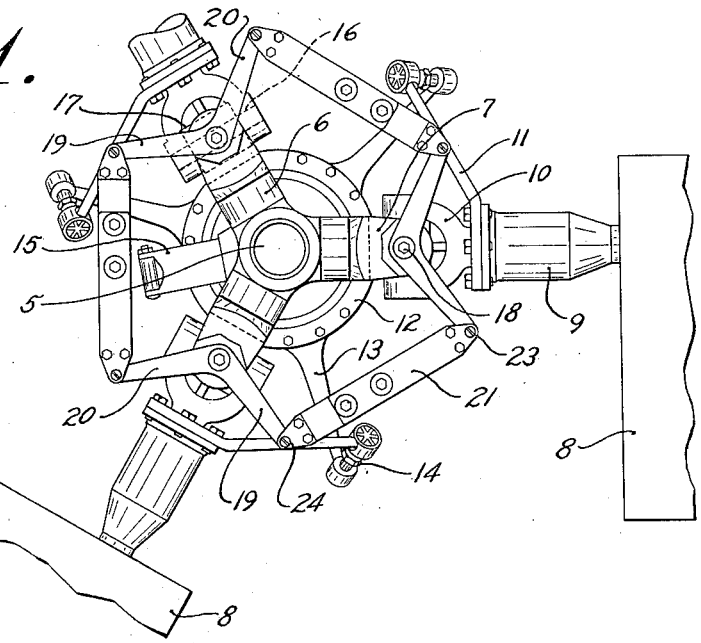
Figure 1 is a plan view of a rotor hub incorporating the dampers of the present invention.

The rotor system as illustrated in Figure 1 incorporates a central hub member 5 with three radially extending arms 6 attached thereto, the ends of arms 6 being shaped to form forks 7. Rotor blades 8 are attached to the rotor hub, there being a blade attached to each arm 6. The rotor blade 8 is constructed with a longitudinal spar member which attaches to the cylindrical terminal 9. The cylindrical terminal 9 in turn is mounted by means of bearings on the fork member 10. An axle portion of fork 10 extends inside the cylindrical housing 9 to provide for pitch change movements of the blades while at the same time retaining them against the action of centrifugal force. The arm 11, attached to cylindrical housing 9, provides for the transmission of blade pitch movements. Blade pitch movements are initiated by the pilot controls which are connected to the swash plate 12 in a fashion suitable to move the swash plate as a whole to accomplish simultaneous pitch change movements or to tilt the plane of the swash plate to produce cyclic pitch change of the blades. The swash plate movements are transferred to the blade arm 11 through arms 13 rigidly attached to the swash plate member and push-pull rods 14. The outer portion of the swash plate member rotates with the blades, a scissors device 15 being provided for this purpose.

The blade forks 10 are mounted on horizontal or flapping pivots to permit the blades to move in a direction transverse to the plane of rotation. Blade pivot 16 is provided for this purpose and extends through the blade fork 10 and through the block 17. The block 17 forms a universal block there being a second pivot 18 with its axis vertical which extends through the fork 7 and the block 17 to form a pivot which permits the blade to change its position in the plane of rotation. On pivot 18, sometimes called the drag pivot, the blade may move away from the true radial position in response to the various dynamic and aerodynamic forces applied to it.

Connected rigidly to each pivot 18 there is a pair of arms consisting of leading arm 19 and lagging arm 20. These arms 19 and 20 thus move with the blades 8 when they move in the leading and lagging sense. Flapping movements of the blades however have no effect upon the arms 19 and 20.

Interconnecting the leading arm 19 of one blade with the lagging arm 20 of an adjacent blade there is a damper device 21 which is adapted to change its length to allow variations in the relative positions of the adjacent blades. This motion of the damper 21 develops a non-reactive restraining force which produces a damping action for the blade motions.

The damper 21 has a pivotal connection at each end indicated at 23 and 24 so that only axial loads are transferred from the arms to the damper.

Figure 2:
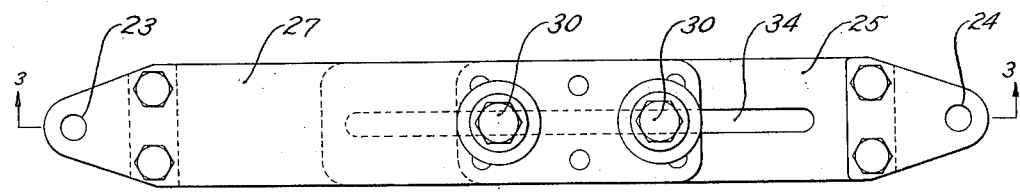
Figure 2 is an enlarged plan view of one of the dampers illustrated in Figure 1.
Figure 3:
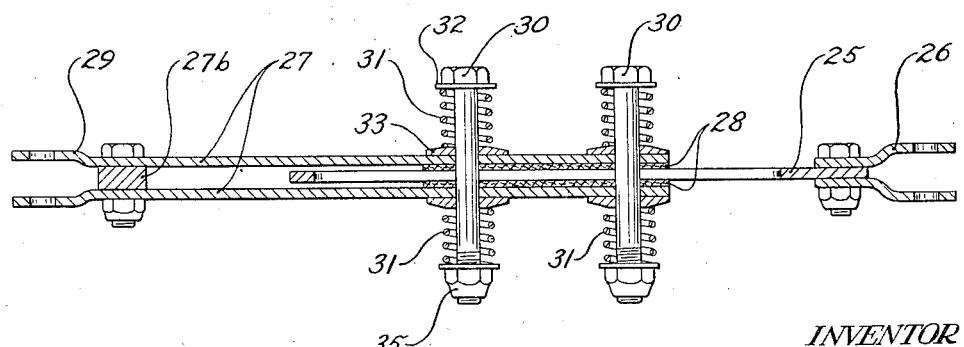
Figure 3 is a longitudinal sectional view of the damper taken along the line 3—3 of Figure 2.

The details of construction of the damper device 21 are more clearly illustrated in Figures 2 and 3. A central plate 25 is provided having a terminal fitting 26 suitable for attaching the damper to one of the arms 19 or 20. Two plates 27, one of which is arranged on each side of the plate 25, are provided with friction plates 28 which are preferably attached to the plates 27 in some suitable manner such as by cement or rivets. Plates 27 are supported in proper relationship by means of a block 27b, the ends of plates 27 being formed to provide a mounting terminal 29, for attachment to the end of one of the arms 19 or 20. In order to provide for applying a pressure between friction plates 28 and plate 25, a pair of bolts 30 are arranged in longitudinally spaced relationship. Springs 31 are supported around bolts 30 to apply pressure to the plates. Washers 32 and 33 are used to apply and distribute the spring pressure at the proper points. A slot 34 is provided in plate 25 so that bolts 30 may pass therethrough. The slot 34 provides sufficient clearance to allow the damper 21 to travel to its extreme range unrestricted except for the friction between the plates. This arrangement of the bolts and slot provides for the proper operational alignment of the plates 25 and 27.

Application of pressure to the plates is accomplished by tightening the nuts 35 sufficiently to give the desired pressure to produce the frictional restraint for the particular installation. Close adjustment may be accomplished by this construction. The use of springs on both sides of the damping unit provides for equal application of pressure at all times by eliminating the effect of wear in the bolts which might cause a sticking action of a variable nature.

The use of a resilient member such as the springs 31 shown in Figure 3 which are under a considerable degree of compression when the normal load is applied to them provides for a constant load application to the friction surface. This applied load remains relatively unchanged even though there may be considerable wear in the friction material. With this construction the dampers remain in proper adjustment over a long period of time.

In order to remove the damper during disassembly of the rotor or for inspection or repair, only the removal of the two bolts at 23 and 24 is required. With this damper mounting it is also a simple matter to check the damper capacity during periodic inspections of the rotor to see that it is in the proper adjustment. This may be done by simply removing one bolt, such as 23, and attaching a spring scale to the free end of the damper. A pull is then applied to the scale until the damper moves in a steady motion and the scale reading is taken. This damper check and any adjustment required may be made without removal of the damper from the hub.

From the foregoing description it will be obvious that I have provided a damping device which is extremely simple in construction, easy to adjust and reliable in operation. The bolts used in the assembly of the parts, including those for application of the pressure to the friction plates, may be standard sizes thus further reducing the cost of manufacture. Simplification of the construction is also provided by the use of the same bolts for retaining the plates in proper position and for applying the pressure to the friction plates. The mounting of the damper by terminal pivots which are parallel to the assembly bolts assures that no bending loads are introduced into the plates.

I claim:

1. For an aircraft rotor having a hub, a plurality of blades each connected to said hub by a generally vertically disposed pivot, a pair of arms associated with each of said vertical pivots and arranged to move with the blade as it swings thereon, a damping device for the control of blade movements on said pivot, said device being attached by a pivot located at one end of the arms associated with one of the blades, and being attached by a pivot at the other end to one of the arms associated with another blade, said device having an elongated central plate member and two outer elongated plate members, friction material interposed between said plates, means for retaining said plates in proper relative position and to allow longitudinal movements of the inner plate relative to the outer plates and adjustable means to apply a pressure between the outer plates and the inner plates.

2. A damping unit for an aircraft rotor having at least one inner elongated plate member with an elongated slot therein, at least two outer plates attached together at one end and partly overlying said inner plate member, friction material interposed between said outer plate members and said inner plate member, at least two bolt-like members longitudinally spaced in said outer plates and passing through the slot in said inner plate, and resilient means adjacent said bolt-like members for applying pressure to said outer plate members.

3. A damping unit for an aircraft rotor having relatively movable elongated plate members, at least two bolt-like members for retaining said plate members in proper relative position, an elongated slot in one of said plate members through which said bolt-like members pass to permit relative longitudinal movements, a resilient element associated with said bolt-like members to apply a pressure to said plate members, all of said plate members being flat in the region of contact with each other, and adjustable means associated with said bolt-like members for varying the applied pressure.

4. A damping unit for an aircraft rotor having an inner rectangular elongated plate with an elongated slot therein, two outer rectangular elongated plates arranged in partly over-lapping position with respect to said inner plate, a friction surface interposed between each of said outer plates and said inner plate, two adjustable members longitudinally spaced and passing through said outer plates and the slot in said inner plate, a resilient element adjacent to each of said members and contacting at least one of said outer plates, pivot means for supporting the end of said inner plate and pivot means for supporting the ends of said outer plates, said pivots being in longitudinal alignment with said slot.

5. A damper unit for an aircraft rotor including a pair of outer elongated plates and an inner elongated plate adapted to move relative to each other in a longitudinal direction, friction material between said outer plates and said inner plate, a plurality of bolts in longitudinally spaced relationship extending through said outer plates and said inner plate, a slot in said inner plate through which said bolts pass, a spring associated with each of said bolts for applying resilient pressure between said plates, a pivot at each end of said unit, the axes of said pivots being parallel to said bolts.

6. A friction damper device for the control of aircraft rotor blades having relatively movable plates including an elongated central plate, two elongated external plates each having a portion overlapping said central plate and having friction material interposed therebetween, said central plate having a mounting pivot at one end, said external plates having a mounting pivot at the opposite end, both of said pivots being removed from the friction contact region, a plurality of bolt members longitudinally spaced and passing through said plates, said bolt members being adapted to apply pressure to the friction area and to maintain proper relative alignment of said plates, said bolt members and said pivots being in longitudinal alignment.

HARRIS S. CAMPBELL.

REFERENCES CITED

The following references are of record in the file of this patent:

UNITED STATES PATENTS

| Number | Name | Date |
| --- | --- | --- |
| 1,123,916 | Nelson | Jan. 5, 1915 |
| 1,254,400 | Gee | Jan. 22, 1918 |
| 1,631,079 | Wellman | May 31, 1927 |
| 1,899,096 | Larsen | Feb. 28, 1933 |
| 1,948,457 | Larsen | Feb. 20, 1934 |
| 1,948,458 | Cierva | Feb. 20, 1934 |
| 1,949,410 | Cierva | Mar. 6, 1934 |
| 2,114,808 | Pitcairn | Apr. 19, 1938 |
| 2,151,280 | Rouy | Mar. 21, 1939 |
| 2,284,717 | Bennett | June 2, 1942 |

FOREIGN PATENTS

| Number | Country | Date |
| --- | --- | --- |
| 344,777 | France | Sept. 15, 1904 |